J. A. PALMER.
Animal Trap.

No. 200,930.  Patented March 5, 1878.

WITNESSES:
C. Neveux
C. Sedgwick

INVENTOR:
J. A. Palmer
BY Munn & Co
ATTORNEYS.

N. PETERS, PHOTO-LITHOGRAPHER, WASHINGTON, D C.

UNITED STATES PATENT OFFICE.

JACOB A. PALMER, OF NOBLE, ILLINOIS.

IMPROVEMENT IN ANIMAL-TRAPS.

Specification forming part of Letters Patent No. 200,930, dated March 5, 1878; application filed December 11, 1877.

*To all whom it may concern:*

Figure 1:
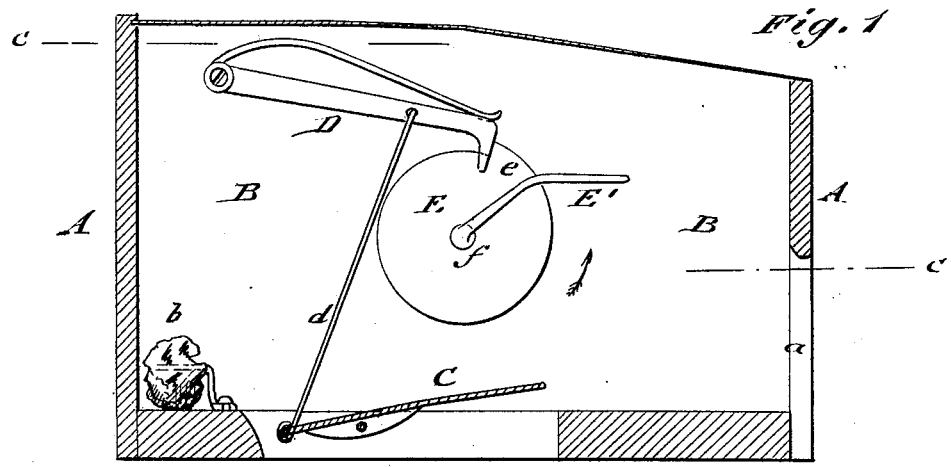
Figure 2:
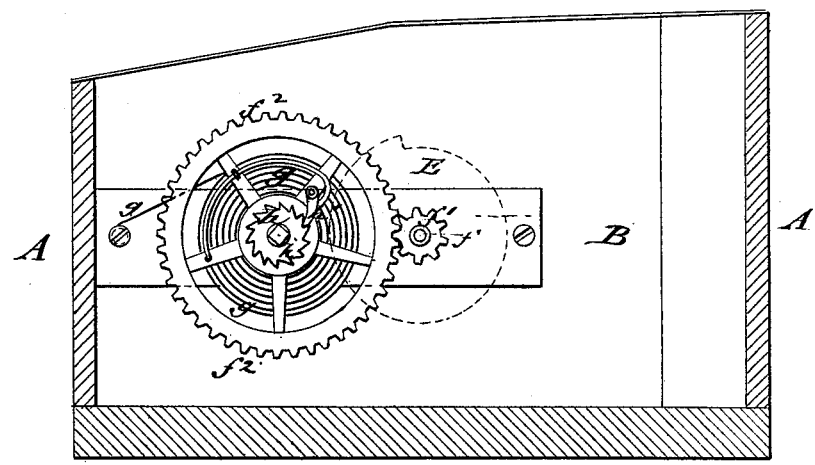
Figure 3:
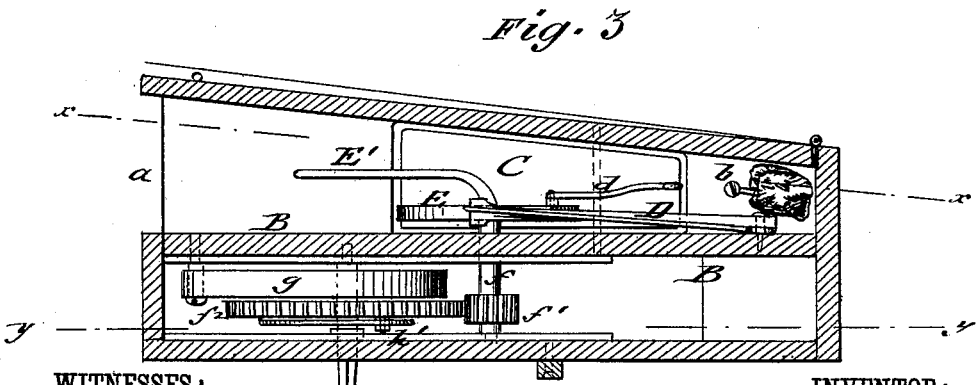

Be it known that I, JACOB A. PALMER, of Noble, in the county of Richland and State of Illinois, have invented a new and Improved Animal-Trap, of which the following is a specification:

In the accompanying drawing, Figures 1 and 2 represent vertical longitudinal sections of my improved animal-trap, respectively on lines $x\,x$ and $y\,y$, Fig. 3; and Fig. 3 is a horizontal section of the same on line $c\,c$, Fig. 1.

Similar letters of reference indicate corresponding parts.

This invention has for its object to furnish an improved animal-trap, by which an animal may be killed at every tripping of the treadle, the same removed from the trap, and the trap reset in automatic manner for the next action.

The invention will first be described in connection with the drawing, and then pointed out in the claim.

Referring to the drawing, A represents the box or casing of my improved trap for killing mice, rats, or other animals, which is divided by a longitudinal partition, B, into two chambers—one for receiving the trap proper, the other for receiving the actuating-spring and gearing.

The box is closed by a sheet-iron cover, that protects the interior working parts against exposure.

The space or chamber containing the trap arrangement has an opening, $a$, at the end, and a wire-holder, $b$, for the bait at the opposite end.

Between the bait and opening is arranged the treadle C, which is fulcrumed into a bottom opening of the box, and connected with a forked spring-acted drop-lever or pawl, D, by a pivot-rod, $d$, that extends from the rear end of the treadle to the drop-pawl.

The forked pawl D rides on a cam-wheel until it engages a projecting or notched part, $e$, of the same, as shown in Fig. 1, so as to retain it in position.

The cam-wheel E is keyed to a shaft, $f$, that extends into the adjoining chamber, and engages by a pinion, $f^1$, a large cog-wheel, $f^2$.

A strong coil-spring, $g$, is attached to the shaft of the cog-wheel $f^2$ and to a post of the partition, and wound up to any required degree of tension by a key placed on the square outside end of the cog-wheel shaft. A fixed ratchet and spring-pawl, $h'$, of cog-wheel $f^2$ retains the spring in wound-up state, in analogous manner as in clock-trains.

An arm, E', is rigidly keyed to the shaft of the cam-wheel E, and in front of the same, and made to swing centrally and longitudinally over the treadle, so as to strike any animal that passes into the box toward the bait, and trips the treadle by the release of the drop-pawl from the notch of the cam-wheel, and by the instantly-revolving action of the cam-wheel and arm. The quickly-revolving arm strikes the head of the animal, kills it instantly, and sends it at the same time by the force of the blow through the opening to the outside of the trap, without leaving any stain of blood or taint of death that would prevent other animals from entering the trap.

The trap resets itself by the drop-pawl after each revolution of the cam-wheel, so as to be continually ready for action until the spring is run down.

The trap may be constructed in large or small size, according to the size of the animals to be killed thereby. It may be readily wound up, and works, when once set, in reliable manner until run down, forming a simple, durable, and effective trap for mice, rats, and similar animals.

I am aware that it is not new to make a trap so that the animal steps on a platform, and, in order to reach the bait, must release a spring-propelled hook or prong, that rotates and strikes the animal; but

What I claim is—

The pawl D, connected by rigid rod $d$ with tilting platform C, in combination with the wheel E, having shoulder $e$, and backwardly-bent arm E', as and for the purpose specified.

JACOB ADDISON PALMER.

Witnesses:
H. M. SANDERSON,
JOHN SHAFFER.